(12) United States Patent
Takahashi et al.

(10) Patent No.: US 12,469,538 B2
(45) Date of Patent: Nov. 11, 2025

(54) RESISTANCE CHANGE MEMORY, MEMORY DEVICE, AND MEMORY SYSTEM

(71) Applicant: SONY SEMICONDUCTOR SOLUTIONS CORPORATION, Kanagawa (JP)

(72) Inventors: Haruko Takahashi, Kanagawa (JP); Masami Kuroda, Kanagawa (JP); Hiroyuki Tezuka, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 130 days.

(21) Appl. No.: 18/258,405

(22) PCT Filed: Dec. 16, 2021

(86) PCT No.: PCT/JP2021/046488
§ 371 (c)(1),
(2) Date: Jun. 20, 2023

(87) PCT Pub. No.: WO2022/145251
PCT Pub. Date: Jul. 7, 2022

(65) Prior Publication Data
US 2024/0038286 A1    Feb. 1, 2024

(30) Foreign Application Priority Data

Dec. 28, 2020 (JP) ................. 2020-218396

(51) Int. Cl.
*G11C 11/00* (2006.01)
*G11C 11/16* (2006.01)

(52) U.S. Cl.
CPC ...... *G11C 11/1675* (2013.01); *G11C 11/1653* (2013.01); *G11C 11/1697* (2013.01)

(58) Field of Classification Search
CPC ............ G11C 11/1675; G11C 11/1653; G11C 11/1697
(Continued)

(56) References Cited

U.S. PATENT DOCUMENTS

| 5,412,605 A | * | 5/1995 | Ooishi | G11C 11/4091 365/208 |
| 6,049,482 A | * | 4/2000 | Aritome | G11C 16/10 365/185.24 |

(Continued)

FOREIGN PATENT DOCUMENTS

| JP | 2018-092696 A | 6/2018 |
| WO | 2010/070895 A1 | 6/2010 |

OTHER PUBLICATIONS

International Search Report and Written Opinion of PCT Application No. PCT/JP2021/046488, issued on Feb. 1, 2022, 08 pages of ISRWO.

*Primary Examiner* — Viet Q Nguyen
(74) *Attorney, Agent, or Firm* — CHIP LAW GROUP

(57) ABSTRACT

A leakage current of a MOS transistor that performs writing is reduced. The resistance change memory includes a memory cell, a write drive unit, a write control unit, and a well potential adjustment unit. The memory cell includes a resistance change element. The write drive unit applies a write voltage to the memory cell to perform writing of data. The write control unit outputs a write control signal for controlling the writing to the write drive unit. The well potential adjustment unit adjusts a well potential of a well region in which an element constituting the write drive unit is arranged according to the write voltage at time of the writing.

11 Claims, 13 Drawing Sheets

(58) Field of Classification Search
USPC .......................................................... 365/158
See application file for complete search history.

(56) References Cited

U.S. PATENT DOCUMENTS

| | | | | | |
|---|---|---|---|---|---|
| 6,344,758 | B1* | 2/2002 | Turner | ............... | H03K 19/0027 |
| | | | | | 326/38 |
| 6,370,052 | B1* | 4/2002 | Hsu | ...................... | G11C 15/043 |
| | | | | | 365/49.11 |
| 6,853,583 | B2* | 2/2005 | Diorio | ................ | G11C 16/3472 |
| | | | | | 365/185.21 |
| 7,502,275 | B2* | 3/2009 | Nii | ........................ | G11C 11/419 |
| | | | | | 365/189.08 |
| 8,248,854 | B2* | 8/2012 | Ogawa | ................... | G11C 16/32 |
| | | | | | 365/185.12 |
| 8,279,654 | B2* | 10/2012 | Otsuka | ................... | H10B 63/82 |
| | | | | | 365/100 |
| 8,339,862 | B2* | 12/2012 | Aiika | ..................... | G11C 16/12 |
| | | | | | 365/185.23 |
| 8,493,795 | B2* | 7/2013 | Kuriyama | ............... | G05F 1/563 |
| | | | | | 365/185.23 |
| 8,873,291 | B2* | 10/2014 | Torricelli | .......... | H01L 29/42324 |
| | | | | | 365/72 |
| 2004/0042295 | A1* | 3/2004 | Fujiwara | ............... | H10D 30/69 |
| | | | | | 257/E21.679 |
| 2013/0258766 | A1* | 10/2013 | Conte | ................. | G11C 13/004 |
| | | | | | 365/163 |

* cited by examiner

| COMMAND | STANBY | WRITING | | |
|---|---|---|---|---|
| WRITE DATA | - | 1(H) | 0(L) | |
| D | - | on | off | |
| DB | - | off | on | |
| WL | off | on | on | |
| PGD | off | on | off | |
| PGDB | off | off | on | |
| CSLb0 | VDDL(off) | VSS(on) | VSS(on) | *SELECTED Tr |
| CSLb1 | VDDL(off) | VDDM(off) | VDDM(off) | *UNSELECTED Tr |
| VWP | VDDL | VDDM | VDDM | |

FIG.11

| COMMAND | STANBY | WRITING | |
|---|---|---|---|
| WRITE DATA | - | 1(H) | 0(L) |
| D | - | on | off |
| DB | - | off | on |
| WL | off | on | on |
| PGD | off | on | off |
| PGDB | off | off | on |
| VDDH | - | VDDH1 | VDDH2 |
| CSLb0 | VDDL(off) | VSS(on) | VSS(on) |
| CSLb1 | VDDL(off) | VDDM1/VDDL | VDDM2/VDDL |
| VWP1 | VDDL | VDDM1 | VDDL |
| VWP2 | VDDL | VDDL | VDDM2 |

RESISTANCE CHANGE MEMORY, MEMORY DEVICE, AND MEMORY SYSTEM

CROSS REFERENCE TO RELATED APPLICATIONS

This application is a U.S. National Phase of International Patent Application No. PCT/JP2021/046488 filed on Dec. 16, 2021, which claims priority benefit of Japanese Patent Application No. JP 2020-218396 filed in the Japan Patent Office on Dec. 28, 2020. Each of the above-referenced applications is hereby incorporated herein by reference in its entirety.

FIELD

The present disclosure relates to a resistance change memory, a memory device, and a memory system. Specifically, the present invention relates to a resistance change memory, and a memory device and a memory system using the resistance change memory.

BACKGROUND

A resistance change memory in which a resistance change element whose resistance value changes according to an applied voltage is employed as a nonvolatile memory element is used. This resistance change element is a two-terminal element, and can take two states of a high resistance value state (high resistance state) and a low resistance value state (low resistance state). One bit of data is stored by these two states. Writing of data can be performed by applying a write voltage to the resistance change element to mutually transition to a high resistance state and a low resistance state. There has been proposed a resistance change memory that applies write voltages of different polarities in a transition to a high resistance state and a transition to a low resistance state at the time of writing (See, for example, Patent Literature 1.).

In this resistance change memory, writing is performed by applying a write voltage to one terminal of a resistance change element (variable resistance element) and grounding the other terminal. The polarity of the write voltage can be changed by exchanging a terminal to which the write voltage is applied and a terminal to be grounded. The write voltage can be applied by a MOS transistor.

CITATION LIST

Patent Literature

Patent Literature 1: JP 2018-092696 A

SUMMARY

Technical Problem

However, the above-described conventional technique has a problem that a leakage current flows in a well region of a MOS transistor that applies a write voltage to a variable resistance element at the time of writing. In the above-described conventional technique, a write voltage to the variable resistance element is applied to a back gate of the MOS transistor to which a write voltage is applied. This is because a forward current flows through the well region to which the back gate is connected.

Therefore, the present disclosure proposes a resistance change memory that reduces a leakage current of a MOS transistor that performs writing.

Solution to Problem

A resistance change memory according to the present disclosure includes: a memory cell including a resistance change element; a write drive unit that applies a write voltage to the memory cell to perform writing of data; a write control unit that outputs a write control signal for controlling the writing to the write drive unit; and a well potential adjustment unit that adjusts a well potential of a well region in which an element constituting the write drive unit is arranged according to the write voltage at time of the writing.

BRIEF DESCRIPTION OF DRAWINGS

FIG. 11 is a diagram illustrating an example of a data write operation according to the third embodiment of the present disclosure.

DESCRIPTION OF EMBODIMENTS

Hereinafter, embodiments of the present disclosure will be described in detail with reference to the drawings. The description will be given in the following order. Note that, in each of the following embodiments, the same parts are denoted by the same signs, and redundant description will be omitted.
1. First Embodiment
2. Second Embodiment
3. Third Embodiment
4. Memory device and electronic device

1. First Embodiment

[Configuration of Resistance Change Memory]

Figure 1:
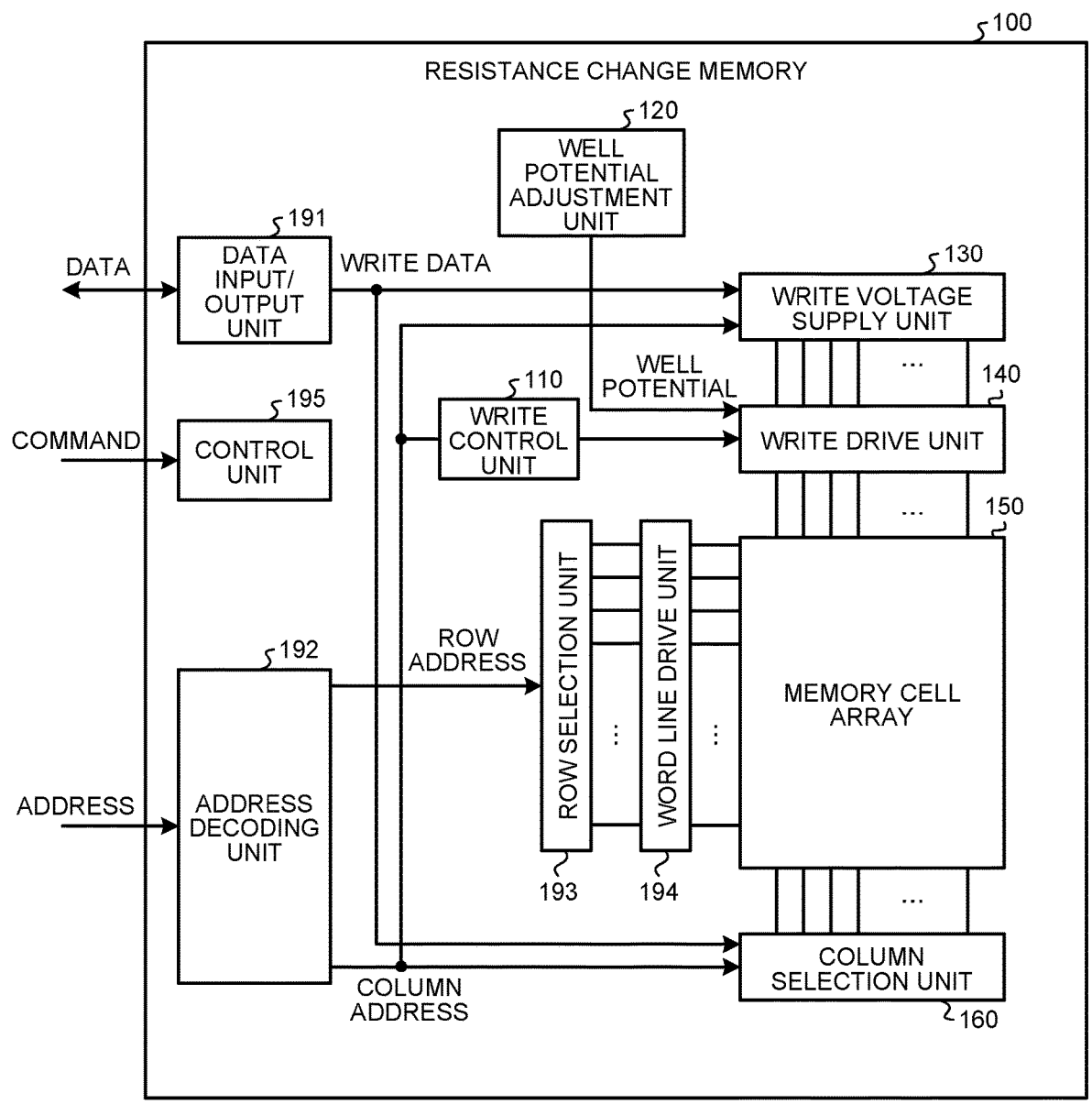
FIG. 1 is a diagram illustrating a configuration example of a resistance change memory according to an embodiment of the present disclosure.

FIG. 1 is a diagram illustrating a configuration example of a resistance change memory according to an embodiment of the present disclosure. The drawing is a block diagram illustrating a configuration example of a resistance change memory 100. The resistance change memory 100 includes a data input/output unit 191, an address decoding unit 192, a control unit 195, a memory cell array 150, a write control unit 110, a row selection unit 193, a word line drive unit 194, and a column selection unit 160. Furthermore, the resistance change memory 100 further includes a write voltage supply unit 130, a write drive unit 140, and a well potential adjustment unit 120.

The data input/output unit 191 exchanges data with a circuit outside the resistance change memory 100. The data input/output unit 191 inputs and outputs data read from the memory cell array 150 and data to be written in the memory cell array 150 described later to and from an external circuit. The write data input from the external circuit is output to the write voltage supply unit 130 and the column selection unit 160.

The address decoding unit 192 generates a row address and a column address from an address input from an external circuit. The generated row address is output to the row selection unit 193. Furthermore, the generated column address is output to the write voltage supply unit 130, the write control unit 110, and the column selection unit 160.

The control unit 195 controls the entire resistance change memory 100. Furthermore, the control unit 195 controls writing and reading on the basis of a command input from an external circuit.

The well potential adjustment unit 120 adjusts a potential of a well region of a semiconductor substrate in which an element of the write drive unit 140 described later is formed. Details of the configuration of the well potential adjustment unit 120 will be described later.

In the memory cell array 150, a plurality of memory cells (memory cells 151 and the like to be described later) are arranged in a two-dimensional matrix. Here, each of the memory cells stores 1-bit data. The memory cell of the present disclosure includes a resistance change element. Furthermore, word lines in a row direction and bit lines and source lines in a column direction of the memory cell array 150 are arranged in an XY matrix. Note that the memory cell is connected between each of the bit lines and each of the source lines. The word line is connected to a control terminal of the memory cell. The memory cells are arranged and wired at intersections of the word lines, and bit lines and the source lines. Details of the configuration of the memory cell will be described later.

The write control unit 110 controls writing of data to the memory cell array 150. The write control unit 110 controls writing of data by outputting a write control signal to the write drive unit 140 described later. Specifically, the write control unit 110 selects a column in which a write target memory cell of the memory cell array 150 is arranged based on the column address output from the address decoding unit 192. Next, the write control unit 110 outputs a write control signal for driving an element of the write drive unit 140 corresponding to the memory cell of the selected column. As described above, the write control unit 110 can control the write drive unit 140 to perform write processing.

The row selection unit 193 selects a row in which a write target memory cell of the memory cell array 150 is arranged based on the row address output from the address decoding unit 192. Moreover, the row selection unit 193 outputs a control signal to the word line corresponding to the selected row.

The word line drive unit 194 drives word lines arranged in the memory cell array 150. The word line drive unit 194 is a buffer disposed on the word lines between the row selection unit 193 and the memory cell array 150.

The write voltage supply unit 130 supplies a write voltage to the memory cells of the memory cell array 150. The write voltage supply unit 130 selects a column of the memory cell array 150 based on the column address output from the address decoding unit 192. Moreover, the write voltage supply unit 130 supplies a write voltage to the bit line and the source line of the selected column on the basis of the write data output from the data input/output unit 191. As described later, the write voltage supply unit 130 can supply a write voltage when writing is performed, and can stop the supply of the write voltage at other times. By disposing such a write voltage supply unit 130, it is possible to reduce the power consumption of the resistance change memory 100 as compared with a case where a constant write voltage is supplied. Such control of the write voltage is referred to as power gating.

The write drive unit 140 is disposed between the write voltage supply unit 130, and the bit line and the source line, and outputs the write voltage supplied from the write voltage supply unit 130 to the bit line and the source line. The write drive unit 140 applies a write voltage to the memory cell connected to the bit line and the source line of the selected column by electrically connecting the bit line and the source line of the column selected based on the control signal from the write control unit 110 to the write voltage supply unit 130.

The column selection unit 160 selects a column of the memory cell array 150 based on the column address output from the address decoding unit 192. Moreover, the column selection unit 160 supplies a ground potential to the bit line and the source line of the selected column on the basis of the write data output from the data input/output unit 191. Specifically, the column selection unit 160 grounds the selected bit line and source line on the basis of the write data.

At the time of writing, the write voltage from the write voltage supply unit 130 is applied to one (for example, the source line) of the bit line and the source line arranged in the column of the memory cell array 150, and the other (bit line) is grounded. As a result, the write voltage is applied to the memory cell connected to the bit line and the source line.

Note that, in this drawing, a description of a part for controlling reading of data from the memory cell array 150 is omitted for convenience.

[Configuration of Memory Cell and Peripheral Circuit]

Figure 2:
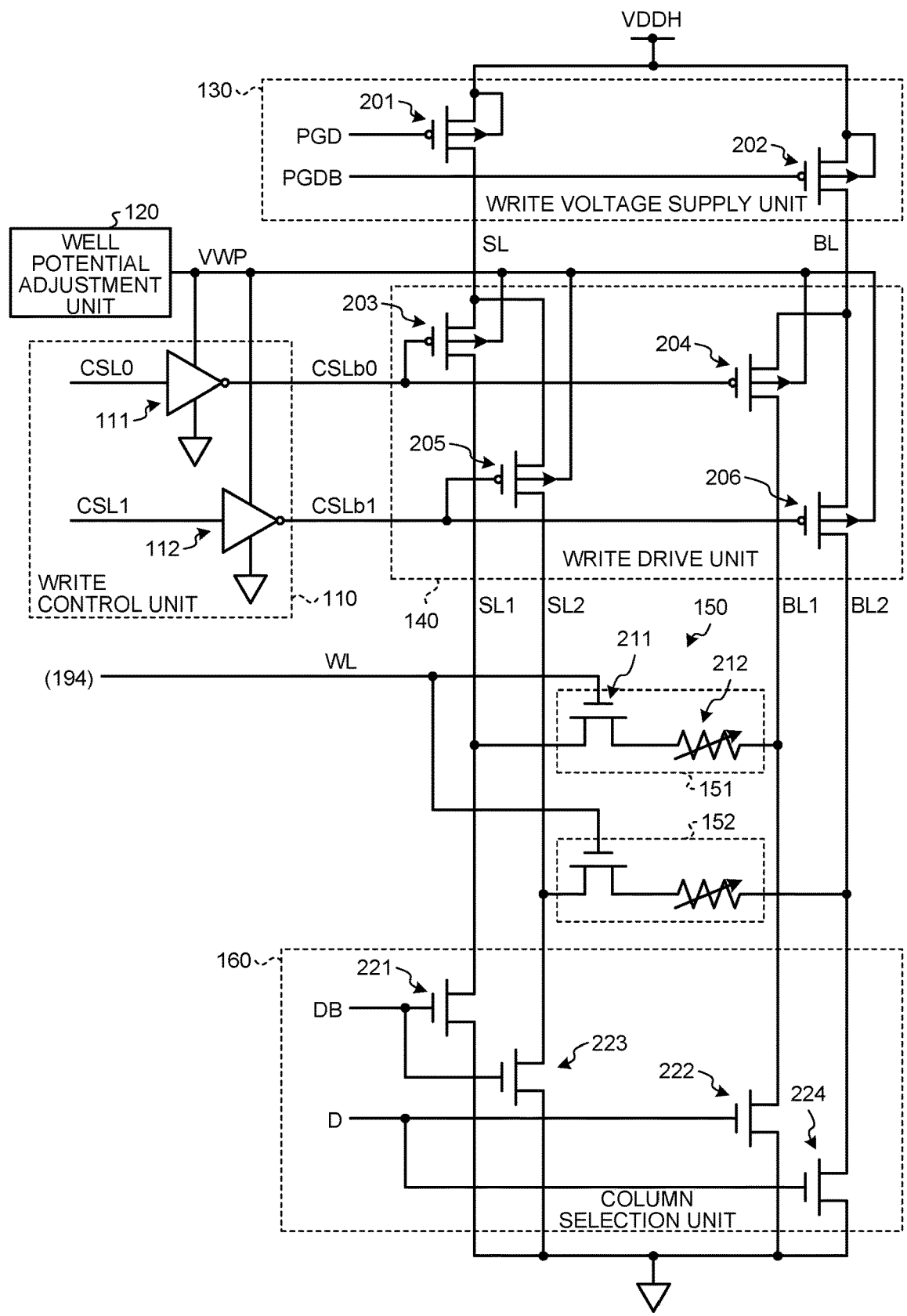
FIG. 2 is a diagram illustrating a configuration example of a memory cell and a peripheral circuit according to a first embodiment of the present disclosure.

FIG. 2 is a diagram illustrating a configuration example of a memory cell and a peripheral circuit according to a first embodiment of the present disclosure. The drawing is a circuit diagram illustrating a configuration example of a memory cell and a peripheral circuit that performs writing on the memory cell. Furthermore, the drawing illustrates memory cells and peripheral circuits for one column of the memory cell array 150.

Memory cells 151 and 152 constituting the memory cell array 150 are illustrated in substantially a center of the drawing. The configuration of the memory cell will be described by taking the memory cell 151 as an example. The memory cell 151 includes a cell transistor 211 and a resistance change element 212 connected in series.

As described above, the resistance change element 212 is a storage element having two states of a high resistance state and a low resistance state capable of transitioning to each other. For example, a magnetoresistive effect element such as a magnetic tunnel junction (MTJ) element can be used for the resistance change element 212. The MTJ element is an element in which a nonmagnetic layer is disposed between two ferromagnetic layers, and is an element in which a resistance value changes according to magnetization directions of the two ferromagnetic layers. The MTJ element is in a high resistance state in a case where the magnetization directions of the two ferromagnetic layers are different, and is in a low resistance state in a case where the magnetization directions are the same. The directions of the magnetizations can be changed by applying a write voltage to the MTJ element. For example, 1-bit data can be stored by associating values "1" and "0" with the high resistance state and the low resistance state of the MTJ element, respectively. Note that the values "1" and "0" can also be referred to as a high level voltage (H) and a low level voltage (L).

The cell transistor 211 is an element that is connected to one end of the resistance change element 212 and controls application of a voltage to the resistance change element 212. The cell transistor 211 can include, for example, an n-channel MOS transistor. A word line WL is connected to a gate of the cell transistor 211.

The memory cell 151 is connected between a source line SL1 and a bit line BL1. The memory cell 152 is connected between a source line SL2 and a bit line BL2.

As described above, the well potential adjustment unit 120 adjusts the potential of the well region of the semiconductor substrate on which elements of the write drive unit 140 are formed. The well potential adjustment unit 120 adjusts the well potential according to the write voltage and outputs the adjusted well potential to a signal line VWP. As will be described later, a substrate of a MOS transistor of the write drive unit 140 is connected to the signal line VWP. Furthermore, in the circuit in the drawing, the signal line VWP is wired as a power supply line of an inverting gate of the write control unit 110.

As described above, the write control unit 110 generates the write control signal on the basis of the column address output from the address decoding unit 192. The write control signals are transmitted via signal lines CSL0 and CSL1 arranged for each column of the memory cell array 150. The signal lines CSL0 and CSL1 are connected to input terminals of inverting gates 111 and 112, respectively. The inverting gates 111 and 112 are buffers of the write control signals. The signal lines CSLb0 and CSLb1 are connected to output terminals of the inverting gates 111 and 112. The signal lines CSLb0 and CSLb1 are signal lines for transmitting the write control signals to the write drive unit 140. Furthermore, the signal lines VWP are connected to the power supply terminals of the inverting gates 111 and 112 in the drawing. Therefore, the inverting gates 111 and 112 output signals of voltages corresponding to the well potentials supplied by the signal line VWP.

The write voltage supply unit 130 includes MOS transistors 201 and 202. These MOS transistors 201 and 202 can include, for example, p-channel MOS transistors. Sources of the MOS transistors 201 and 202 are connected to a power supply line VDDH. Drains of the MOS transistors 201 and 202 are connected to a source line SL and a bit line BL, respectively. Gates of the MOS transistors 201 and 202 are connected to the signal lines PGD and PGDB, respectively. Substrates (back gates) of the MOS transistors 201 and 202 are commonly connected to the power supply line VDDH.

The power supply line VDDH is a power supply line that supplies a write voltage. Hereinafter, the write voltage supplied by the power supply line VDDH will be referred to as VDDH. The signal lines PGD and PGDB transmit drive signals of the MOS transistor 201 and the like according to data to be written to the memory cells 151 and 152. A signal obtained by inverting the signal of the signal line PGD is applied to the signal line PGDB.

The write drive unit 140 includes MOS transistors 203 to 206. These MOS transistors 203 to 206 can include, for example, p-channel MOS transistors. Sources of the MOS transistors 203 and 205 are commonly connected to the source line SL. Drains of the MOS transistors 203 and 205 are connected to the source line SL1 and the source line SL2, respectively. Sources of the MOS transistors 204 and 206 are commonly connected to the bit line BL. Drains of the MOS transistors 204 and 206 are connected to the bit line BL1 and the bit line BL2, respectively. Gates of the MOS transistors 203 and 204 are commonly connected to the signal line CSLb0. Gates of the MOS transistors 205 and 206 are commonly connected to the signal line CSLb1. Substrates of the MOS transistors 203 to 206 are commonly connected to the signal line VWP.

As illustrated in the drawing, the MOS transistor 203 is disposed between the source line SL and the source line SL1. By making the MOS transistor 203 conductive, the write voltage from the write drive unit 140 transmitted by the source line SL can be output to the source line SL1. Similarly, the MOS transistor 205 is disposed between the source line SL and the source line SL2, and outputs the write voltage transmitted by the source line SL to the source line SL2. Furthermore, the MOS transistor 204 is disposed between the bit line BL and the bit line BL1. By conducting the MOS transistor 204, the write voltage transmitted by the bit line BL can be output to the bit line BL1. Similarly, the MOS transistor 206 is disposed between the bit line BL and the bit line BL2, and outputs the write voltage transmitted by the bit line BL to the bit line BL2.

The column selection unit 160 includes MOS transistors 221 to 224. These MOS transistors 221 to 224 can include, for example, n-channel MOS transistors. Sources of the MOS transistors 221 to 224 are grounded. Drains of the MOS transistors 221 and 223 are connected to source lines SL1 and SL2, respectively. Drains of the MOS transistors 222 and 224 are connected to bit lines BL1 and BL2, respectively. Gates of the MOS transistors 221 and 223 are commonly connected to a signal line DB. Gates of the MOS transistors 222 and 224 are commonly connected to a signal line D.

The signal lines D and DB transmit drive signals of the MOS transistor 221 and the like according to data to be written to the memory cells 151 and 152. A signal obtained by inverting the signal of the signal line D is applied to the signal line DB.

Note that, as described later, in the MOS transistors 203 to 206, the signal line VWP is connected to the well region. In the drawing, for convenience, the signal line VWP is connected to the terminals of the substrates of the MOS transistors 203 to 206. In the MOS transistors 201 and 202, the well region can be set to the same potential as the source. The MOS transistors 201 and 202 are arranged in a well region different from the MOS transistors 203 to 206.

[Configuration of Well Potential Adjustment Unit]

Figures 3, 4:
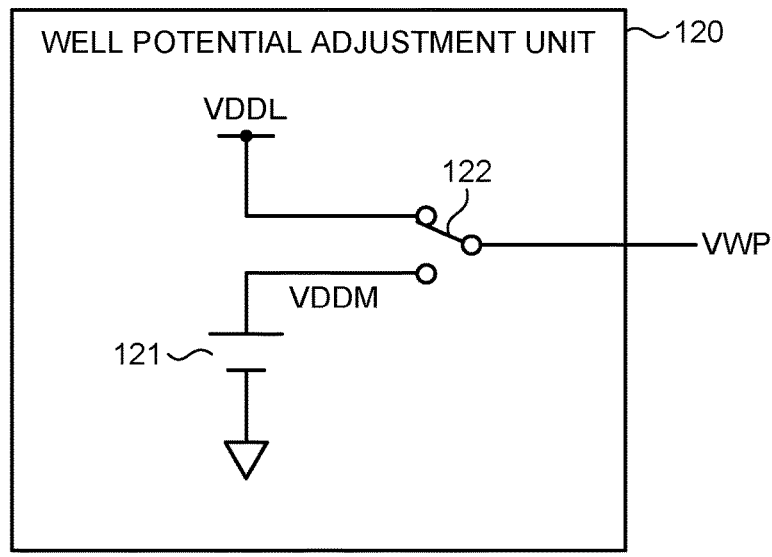
FIG. 3 is a diagram illustrating a configuration example of a well potential adjustment unit according to the first embodiment of the present disclosure.
FIG. 4 is a diagram illustrating an example of a data write operation according to the first embodiment of the present disclosure.

FIG. 3 is a diagram illustrating a configuration example of a well potential adjustment unit according to the first embodiment of the present disclosure. The drawing is a circuit diagram illustrating a configuration example of the well potential adjustment unit 120. The well potential adjustment unit 120 in the drawing includes a voltage source 121 and a selection unit 122. Furthermore, a power supply line VDDL is wired to the well potential adjustment unit 120 in the drawing. The power supply line VDDL is a power supply line that supplies power to a logic circuit in the write control unit 110 or the like. For convenience, a voltage of the power supply supplied by the power supply line VDDL will be referred to as VDDL. VDDL can be, for example, 1.1 V.

The voltage source 121 is a voltage source that supplies well potentials of the MOS transistors 203 to 206 of the write drive unit 140. A voltage of the voltage source 121 can be set to a voltage substantially equal to the write voltage supplied from the write voltage supply unit 130. The voltage supplied by the voltage source 121 is referred to as VDDM. Note that the voltage source 121 can be disposed at an arbitrary position of the resistance change memory 100. Furthermore, the voltage source 121 can be configured by a DC-DC converter (for example, a charge pump circuit) built in the resistance change memory 100. Furthermore, a voltage supplied from a circuit outside the resistance change memory 100 can also be used as the VDDM.

The selection unit 122 selects the power supply line VDDL and the voltage source 121 and supplies the well potentials as an output voltage of the well potential adjustment unit 120. The selection unit 122 can select the voltage source 121 at the time of writing and select the power supply line VDDL at the time other than writing.

As described above, the well potential adjustment unit 120 adjusts the well potential by selecting the power supply line VDDL and the voltage source 121 and outputting the well potential.

[Writing of Data]

FIG. 4 is a diagram illustrating an example of a data write operation according to the first embodiment of the present disclosure. The drawing is a diagram illustrating a truth table of a signal of the circuit of FIG. 2. In the drawing, the command represents a command input to the resistance change memory 100. Examples of a standby command and a write command have been described as this command. Furthermore, an example in which data is written to the memory cell 151 has been described. The write data is 1-bit data to be written to the memory cell 151.

Furthermore, "D", "DB", "WL", "PGD", and "PGDB" in the drawing respectively represent signals of the signal line D, the signal line DB, the signal line WL, the signal line PGD, and the signal line PGDB. As described in FIG. 2, these signal lines are connected to the gates of the MOS transistors. In the drawing, "on" represents a gate drive signal (Hereinafter, referred to as an ON signal) that brings the MOS transistor to which the signal line is connected into conduction. In the drawing, "off" represents a gate drive signal (Hereinafter, referred to as an OFF signal) that makes the MOS transistor to which the signal line is connected non-conductive. As the ON signal of the signal line D, the signal line DB, and the signal line WL, a signal of a voltage of VDDL can be used. As the OFF signal of the signal line D, the signal line DB, and the signal line WL, a signal of a ground potential (VSS) can be used. Furthermore, a signal of a ground potential can be used as the ON signal of the signal line PGD and the signal line PGDB. As the OFF signal of the signal line WL, a signal of a voltage of VDDH can be used.

Furthermore, "CSLb0", "CSLb1", and "VWP" in the drawing represent voltages of the signal line CSLb0, the signal line CSLb1, and the signal line VWP, respectively.

In the case of the standby command, the OFF signal is output to the signal line WL, the signal line PGD, and the signal line PGDB. Furthermore, the signal line CSLb0 and the signal line CSLb1 have voltages of VDDL. The signal of the voltage of VDDL corresponds to OFF signals of the MOS transistors 203 to 206 to which the signal line CSLb0 and the signal line CSLb1 are connected. Furthermore, the well potential adjustment unit 120 selects the well potential of VDDL and outputs the well potential to the signal line VWP.

In the case of the write command, an ON signal is output to the signal line WL, and the cell transistors 211 of the memory cells 151 and 152 are conducted. Furthermore, the signal line CSLb0 becomes the VSS potential, and the voltage of VDDM is applied to the signal line CSLb1. Therefore, the MOS transistors 203 and 204 connected to the signal line CSLb0 are selected and conducted, and the write voltage is output to the source line SL1 and the bit line BL1. The write voltage is applied to the memory cell 151 connected to the source line SL1 and the bit line BL1. On the other hand, the MOS transistors 205 and 206 connected to the signal line CSLb1 go into a non-conductive state and go into a non-selected state. Therefore, the write voltage is not supplied to the source line SL2 and the bit line BL2. Furthermore, the well potential adjustment unit 120 selects the well potential of VDDM and outputs the well potential to the signal line VWP.

On the other hand, different signals are applied to the signal line D, the signal line DB, the signal line PGD, and the signal line PGDB according to the data to be written. In a case where data of the value "1" (H) is written, the ON signal is output to the signal line D and the signal line PGD, and the OFF signal is output to the signal line DB and the signal line PGDB. In a case where data of the value "0" (L) is written, the OFF signal is output to the signal line D and the signal line PGD, and the ON signal is output to the signal line DB and the signal line PGDB.

Figure 5A:
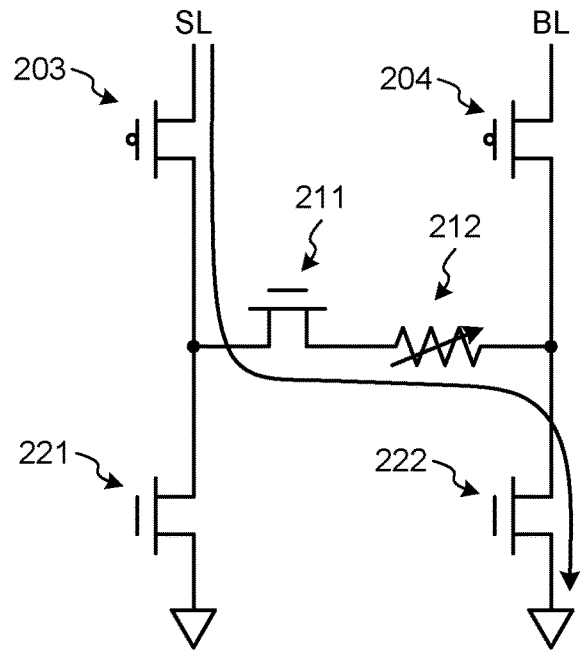
FIG. 5A is a diagram illustrating an example of a data write operation according to the first embodiment of the present disclosure.
Figure 5B:
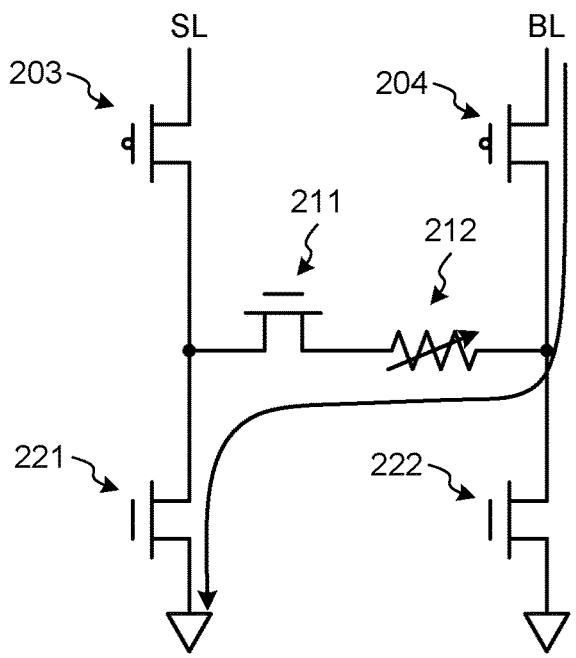
FIG. 5B is a diagram illustrating an example of a data write operation according to the first embodiment of the present disclosure.

FIGS. 5A and 5B are diagrams illustrating an example of a data write operation according to the first embodiment of the present disclosure. FIGS. 5A and 5B are diagrams for explaining a write current by taking the memory cell 151 as an example. A signal of the write command in the truth table of FIG. 4 is applied to the memory cell 151 and the peripheral circuit. FIG. 5A illustrates a case where the value "1" is written, and FIG. 5B illustrates a case where the value "0" is written.

In FIG. 5A, the write voltage supply unit 130 supplies a write voltage to the source line SL. The cell transistor 211 becomes conductive and the MOS transistors 203 and 222 become conductive, and the MOS transistors 204 and 221 become non-conductive. As a result, a write current flows in a direction of an arrow in FIG. 5A.

On the other hand, in FIG. 5B, the write voltage supply unit 130 supplies the write voltage to the bit line BL. The cell transistor 211 becomes conductive and the MOS transistors 204 and 221 become conductive, and the MOS transistors 203 and 222 become non-conductive. As a result, a write current flows in a direction of an arrow in FIG. 5B.

As described above, a write voltage having a polarity corresponding to data to be written is applied to the resistance change element 212.

[Well Voltage at the Time of Writing]

Figure 6A:
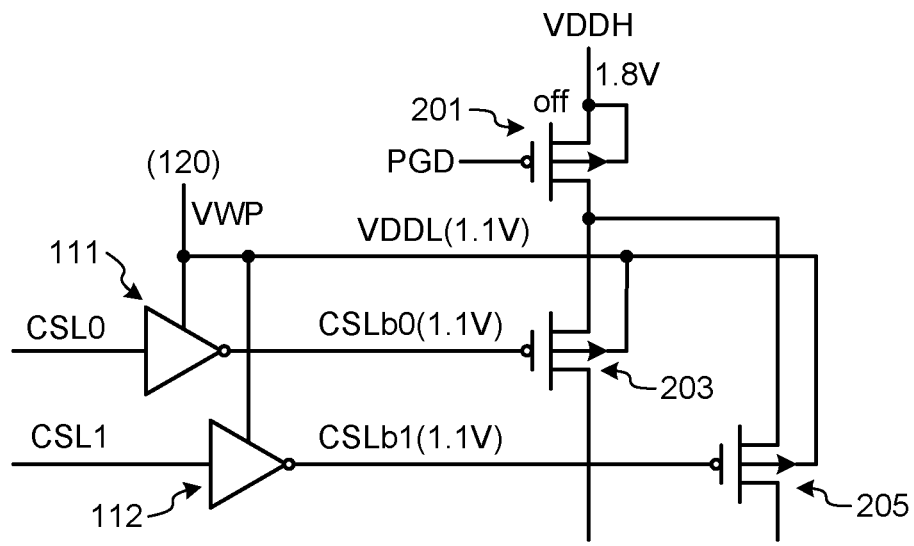
FIG. 6A is a diagram for explaining a well voltage at the time of writing according to the first embodiment of the present disclosure.
Figure 6B:
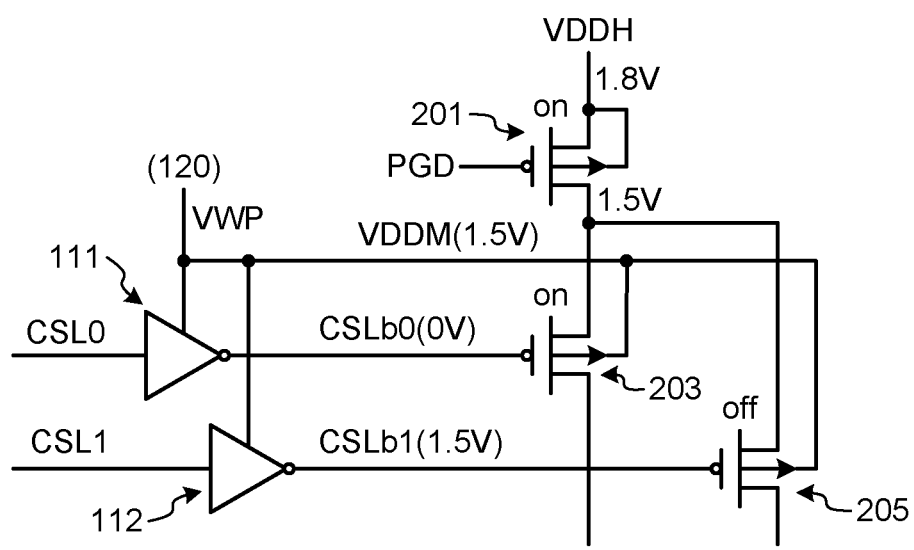
FIG. 6B is a diagram for explaining a well voltage at the time of writing according to the first embodiment of the present disclosure.
Figure 6C:
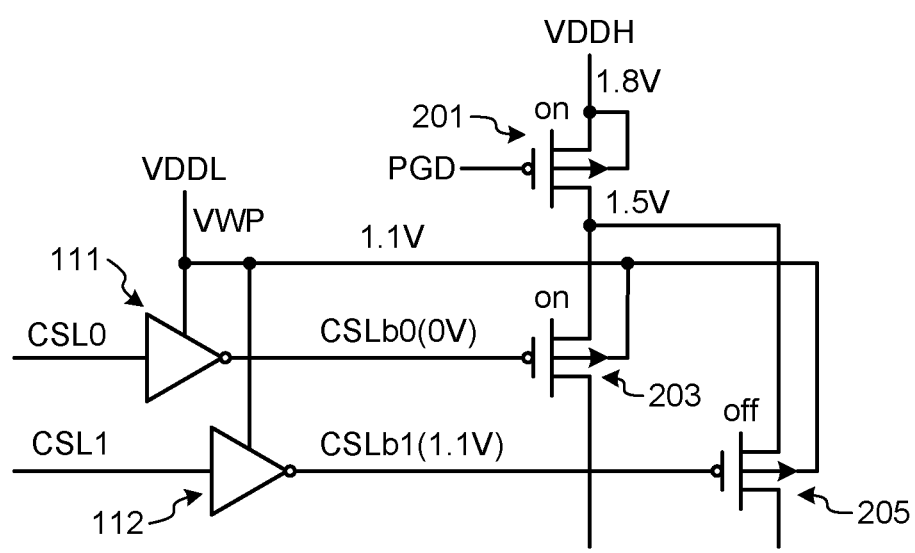
FIG. 6C is a diagram for explaining a well voltage at the time of writing according to the first embodiment of the present disclosure.

FIGS. 6A, 6B, and 6C are diagrams for explaining well voltages at the time of writing according to the first embodiment of the present disclosure. In FIGS. 6A, 6B, and 6C, a case where a voltage of 1.8 V as VDDH is applied to the source of the MOS transistor 201 of the write voltage supply unit 130 is assumed.

FIG. 6A is a diagram illustrating a voltage of each unit during standby. During standby, the MOS transistor 201 of the write voltage supply unit 130 is in a non-conductive state. The well potential adjustment unit 120 outputs a voltage of VDDL to the signal line VWP. In the drawing, a voltage of 1.1 V is assumed as VDDL. The voltage of VDDL is applied to the well regions of the MOS transistors 203 and 205. Furthermore, since VDDL is also applied to power supply terminals of the inverting gates 111 and 112, the ON signals of the signal line CSLb0 and the signal line CSLb1 also substantially becomes a voltage (1.1 V) of VDDL.

FIG. 6B is a diagram illustrating a voltage of each unit at the time of writing. At the time of writing, the MOS transistor 201 of the write voltage supply unit 130 is conducted. Therefore, a write voltage is applied to the sources of the MOS transistors 203 and 205. The well potential adjustment unit 120 outputs VDDM, which is a well potential adjusted according to the write voltage, to the signal line VWP. This adjusted well potential is applied to the well regions of the MOS transistors 203 and 205. Furthermore, VDDM is also applied to the power supply terminals of the inverting gates 111 and 112, and the ON signal of the signal line CSLb1 also substantially becomes a voltage of VDDM.

Note that a write voltage of 1.5 V is output from the drain of the MOS transistor 201. This is because the voltage of VDDH decreases due to a voltage drop (approximately 0.3 V) of the MOS transistor 201. Therefore, the well potential adjustment unit 120 preferably outputs the well potential in consideration of the voltage drop of the element of the write voltage supply unit 130. This is because the voltage applied to the well region can be reduced. The well potential adjustment unit 120 in the drawing outputs 1.5 V as VDDM.

The well regions of the MOS transistors 203 and 205 have the same potential (1.5 V) as the sources. Furthermore, the gate voltage of the unselected MOS transistor 205 also becomes the same potential as the well regions. On the other hand, a potential difference between the gate and the well region of the selected MOS transistor 203 is 1.5 V.

FIG. 6C is a diagram described as a comparative example, and is a diagram illustrating an example of a case where the well potential is not adjusted at the time of writing. VDDL (1.1 V) is output to the signal line VWP in the drawing. Therefore, 1.1 V is applied to the well regions of the MOS transistors 203 and 205. The well region of the MOS transistor 203 has a voltage lower than that of the source, and a leakage current flows from the source to the well region. Furthermore, 1.1 V is also applied to the gate of the unselected MOS transistor 205. A gate voltage of the MOS transistor 205 becomes lower than the source, and a leakage current flows from the source to the drain.

[Leakage Current of Write Drive Unit]

Figure 7:
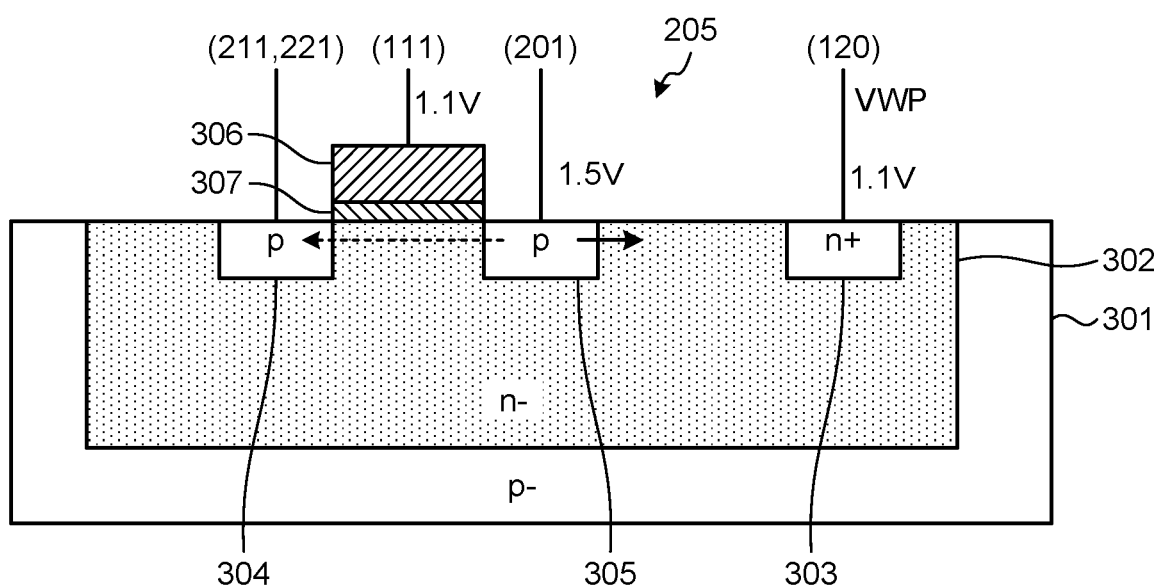
FIG. 7 is a diagram illustrating a configuration example of a write drive unit according to the first embodiment of the present disclosure.

FIG. 7 is a diagram illustrating a configuration example of a write drive unit according to the first embodiment of the present disclosure. The drawing is a diagram for explaining a leakage current of the MOS transistor of the write drive unit 140 in FIG. 6C described above. The leakage current will be described using the MOS transistor 205 as an example. The MOS transistor 205 is disposed in a well region 302 formed in a semiconductor substrate 301. In the drawing, the semiconductor substrate 301 configured to have a p-type conductivity is assumed. The well region 302 is configured to have an n-type conductivity. P-type semiconductor regions 304 and 305 are disposed in the n-type well region. The p-type semiconductor regions 304 and 305 constitute a drain region and a source region, respectively. Furthermore, a gate electrode 306 is disposed adjacent to the well region 302 between the p-type semiconductor regions 304 and 305. Note that the gate electrode 306 is disposed adjacent to the well region via a gate insulating film 307. A channel is formed in the well region immediately below the gate electrode 306.

Furthermore, an n-type semiconductor region 303 is disposed in the well region 302. The n-type semiconductor region 303 is configured to have a relatively high impurity concentration and constitutes a well contact. The signal line VWP is connected to the n-type semiconductor region 303, and the well potential is supplied from the well potential adjustment unit 120.

In the case of FIG. 6C described above, 1.1 V is applied to the well region 302 and the gate electrode 306. On the other hand, 1.5 V is applied to the semiconductor region 305 constituting the source region. A low voltage in a forward direction is applied between the semiconductor region 305 and the well region 302, and a leakage current flows from the semiconductor region 305 to the well region 302 (well leakage). A solid arrow in the drawing represents this leakage current. Furthermore, a voltage lower than the source is applied to the gate of the MOS transistor 205. Therefore, a channel is formed between the semiconductor regions 305 and 306, and a leakage current flows from the source to the drain although the MOS transistor 205 is unselected (channel leakage). A dotted arrow in the drawing represents this leakage current. When such a leakage current flows, power consumption increases. Furthermore, there is a possibility that writing is performed on the unselected memory cell 152 by a current flowing through the unselected MOS transistor 205.

By constantly applying 1.5 V as the well potential, the occurrence of the well leakage can be prevented. However, in this case, a voltage of 1.5 V is applied to the gate insulating film 307 in a normal state (standby state). In FIG. 6A, 1.1 V is applied during standby, and a relatively high voltage is applied to the gate insulating film 307 in FIG. 6B. Therefore, it is necessary to increase a film thickness of the gate insulating film 307 of the MOS transistor 203 to which the well potential of 1.5 V is applied.

The write voltage supply unit 130 is disposed, and VDDH is applied to the write drive unit 140 and the well potential is adjusted only at the time of writing. As a result, a time period during which a high voltage (VDDH) is applied to the gate insulating film 307 of the MOS transistor 203 or the like of the write drive unit 140 can be shortened. Even in a case where the film thickness of the gate insulating film 307 is relatively thin, deterioration can be reduced. It is possible to downsize the MOS transistor 203 and the like while reducing the leakage current of the write drive unit 140. Furthermore, by adjusting the voltage of the control signal of the write drive unit 140 according to the write voltage, occurrence of the channel leakage of the unselected MOS transistor 205 can be prevented. It is possible to prevent erroneous writing to the unselected memory cell 152.

[Write Processing]

Figure 8:
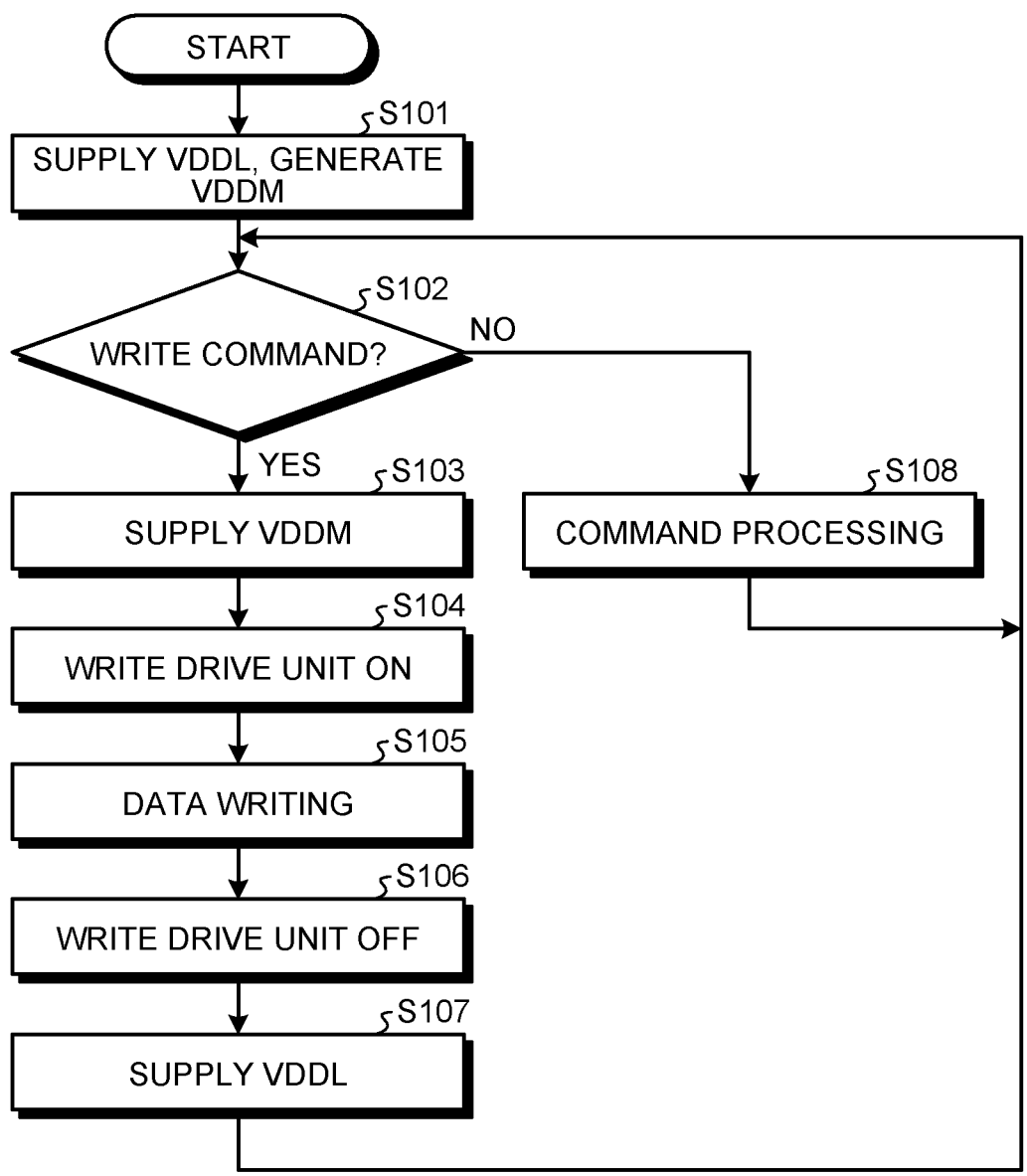
FIG. 8 is a diagram illustrating an example of write processing according to the first embodiment of the present disclosure.

FIG. 8 is a diagram illustrating an example of write processing according to the first embodiment of the present disclosure. The drawing is a diagram illustrating the write processing of the resistance change memory 100. First, VDDL is supplied and VDDM is generated in the well potential adjustment unit 120 (Step S101). Next, it is determined whether a write command has been input (Step S102). In a case where the write command is not input (Step S102, No), processing of the input command is performed (Step S108), and the process proceeds to the processing of S102 again.

In a case where the write command is input in S102 (Step S102, Yes), VDDM is supplied to the MOS transistor 203 and the like of the write drive unit 140 (Step S103). Next, the MOS transistor 203 and the like of the write drive unit 140 are turned on (Step S104). Next, data is written to the memory cell 151 and the like (Step S105). Next, the MOS transistor 203 and the like of the write drive unit 140 are turned off (Step S106). Next, VDDL is supplied to the MOS transistor 203 and the like of the write drive unit 140 (Step S107). Thereafter, the process proceeds to S102. The write processing can be performed by the above procedure.

As described above, in the resistance change memory 100 according to the first embodiment of the present disclosure, the leakage current can be reduced by adjusting the well potential of the elements constituting the write drive unit 140 according to the write voltage. As a result, the resistance change memory 100 can be reduced in power consumption.

2. Second Embodiment

The resistance change memory 100 of the first embodiment supplies VDDL and VDDM as well potentials to the write drive unit 140. On the other hand, a resistance change memory 100 of a second embodiment of the present disclosure is different from that of the first embodiment in that well potentials of three or more voltages are supplied.

[Configuration of Well Potential Adjustment Unit]

Figure 9:
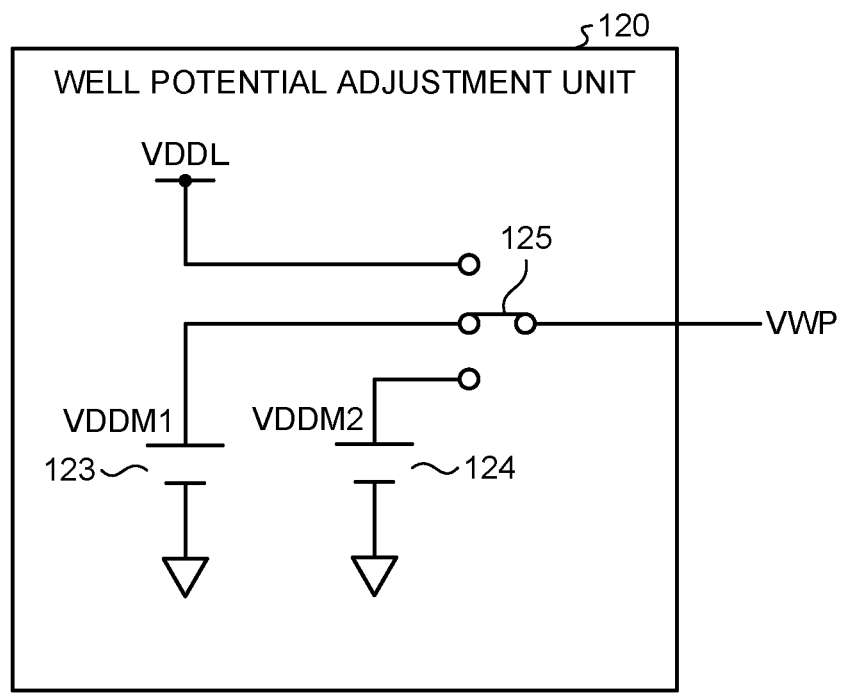
FIG. 9 is a diagram illustrating a configuration example of a well potential adjustment unit according to a second embodiment of the present disclosure.

FIG. 9 is a diagram illustrating a configuration example of a well potential adjustment unit according to the second embodiment of the present disclosure. The drawing is a diagram illustrating a configuration example of a well potential adjustment unit 120, similarly to FIG. 3. The well potential adjustment unit 120 of FIG. 9 is different from the well potential adjustment unit 120 of FIG. 3 in that voltage sources 123 and 124 are provided instead of the voltage source 121, and a selection unit 125 is provided instead of the selection unit 122.

The voltage source 123 outputs a voltage of VDDM1. The voltage source 124 outputs VDDM2 having a voltage higher than VDDM1. The selection unit 125 selects and outputs one of VDDL, VDDM1, and VDDM2. The well potential adjustment unit 120 in the drawing outputs different well potentials (VDDM1 and VDDM2) at the time of writing.

The resistance change memory 100 can perform verify processing of verifying writing after the write processing. In this verify processing, in a case where a write failure is detected, the write processing is performed again. In the first write and the second and subsequent writes, the write voltage can be changed. Specifically, in the second and subsequent writes, a write voltage higher than the write voltage at the time of the first write can be applied to a memory cell 151 and the like. In a case where different write voltages are applied to a write drive unit 140 as described above, the well potential adjustment unit 120 outputs the well potentials (VDDM1 and VDDM2) corresponding to the respective write voltages. As a result, the leakage current of the write drive unit 140 can be reduced in a plurality of write processing having different write voltages. Note that a write voltage supply unit 130 in the second embodiment of the present disclosure can supply different write voltages to the write drive unit 140.

Since other configurations of the resistance change memory 100 are similar to those of the resistance change memory 100 in the first embodiment of the present disclosure, the description thereof will be omitted.

As described above, the resistance change memory 100 according to the second embodiment of the present disclosure supplies well potentials corresponding to a plurality of write voltages to the write drive unit 140. This makes it possible to reduce the leakage current of the write drive unit 140 while preventing a writing failure.

3. Third Embodiment

In the resistance change memory 100 of the first embodiment described above, the same write voltage is applied to the memory cell 151 and the like in writing the value "1" and the value "0". On the other hand, a resistance change memory 100 of a third embodiment of the present disclosure is different from that of the above-described first embodiment in that different write voltages are applied to a memory cell 151 and the like according to write data.

[Configuration of Memory Cell and Peripheral Circuit]

Figure 10:
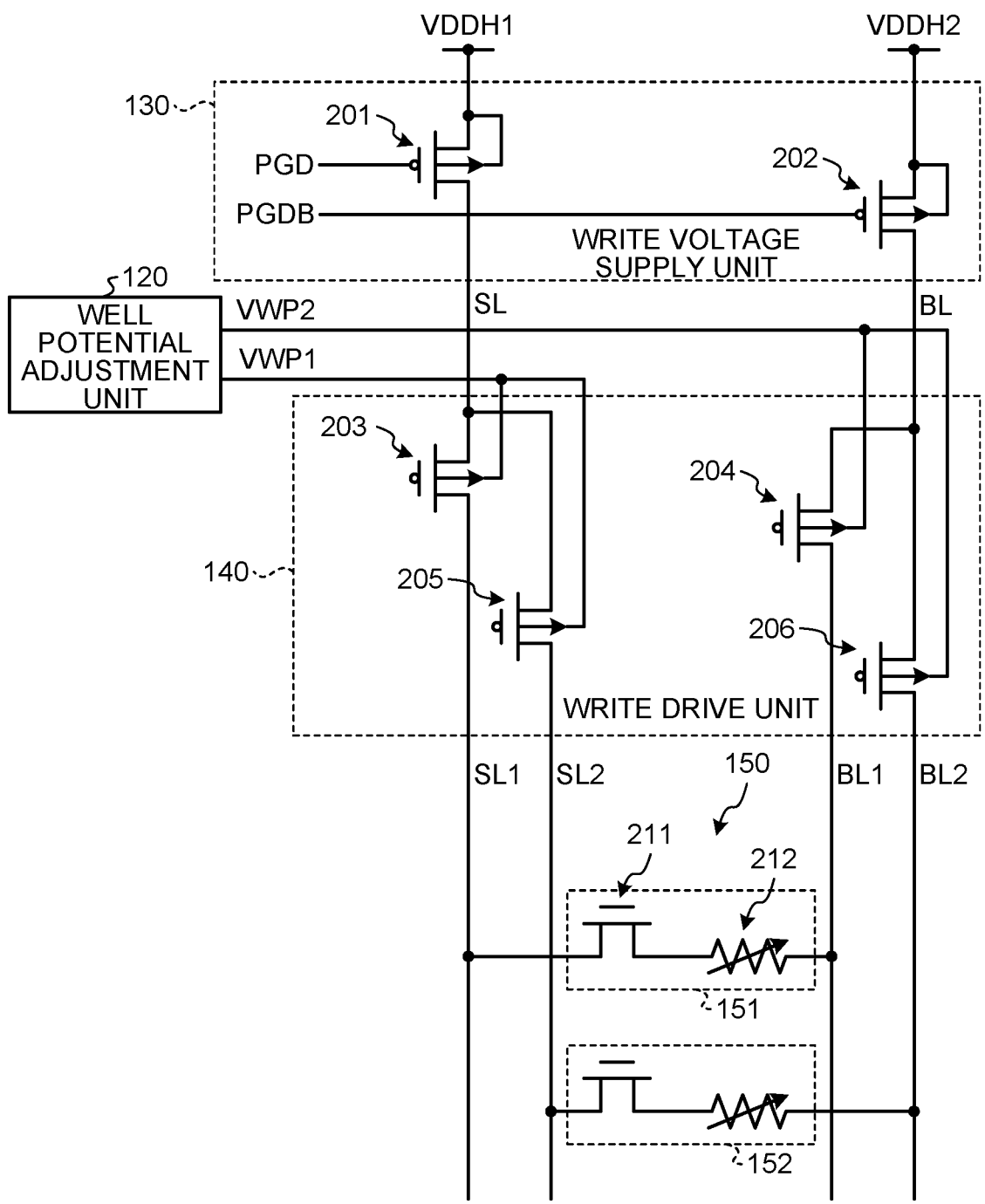
FIG. 10 is a diagram illustrating a configuration example of a memory cell and a peripheral circuit according to a third embodiment of the present disclosure.

FIG. 10 is a diagram illustrating a configuration example of a memory cell and a peripheral circuit according to a third embodiment of the present disclosure. The drawing is a circuit diagram illustrating a configuration example of a memory cell and a peripheral circuit that performs writing on the memory cell, similarly to FIG. 2. The circuit in the drawing is different from the circuit in FIG. 2 in that signal lines VWP1 and VWP2 from a well potential adjustment unit 120 are wired. Note that the circuit in the drawing is: Descriptions of a write control unit 110 and the like are omitted.

The well potential adjustment unit 120 in the drawing includes the signal lines VWP1 and VWP2. Either VDDL or VDDM1 is selected and output to the signal line VWP1. Furthermore, either VDDL or VDDM2 is selected and output to the signal line VWP2. The signal line VWP1 is connected to the substrates of MOS transistors 203 and 205. The signal line VWP2 is connected to the substrates of MOS transistors 204 and 206. Furthermore, VDDH1 is applied to the source of a MOS transistor 201 of a write voltage supply unit 130. Furthermore, VDDH2 is applied to the source of a MOS transistor 202 of the write voltage supply unit 130. VDDM2 is a well potential having a voltage higher than VDDM1, and VDDH2 is a write voltage having a voltage higher than VDDH1.

[Writing of Data]

FIG. 11 is a diagram illustrating an example of a data write operation according to the third embodiment of the present disclosure. Similarly to FIG. 4, FIG. 11 is a diagram illustrating a truth table of signals of a circuit. This differs from the truth table of FIG. 4 in that the signal lines VWP1 and VWP2 are added.

At the time of writing a value "1" (H), VDDH1 is output from the write voltage supply unit 130 and applied to the MOS transistors 203 and 205. VDDM1 is applied as a well potential to the MOS transistors 203 and 205 via the signal line VWP1. On the other hand, VDDL is applied to the MOS transistors 204 and 206 via the signal line VWP2. VDDM1 and VDDL are applied to the gates of the MOS transistors 205 and 206, respectively.

At the time of writing a value "0" (L), VDDH2 is output from the write voltage supply unit 130 and applied to the MOS transistors 204 and 206. VDDM2 is applied as a well potential to the MOS transistors 204 and 206 via the signal line VWP2. On the other hand, VDDL is applied to the MOS transistors 203 and 205 via the signal line VWP1. VDDL and VDDM2 are applied to the gates of the MOS transistors 205 and 206, respectively.

In this manner, different write voltages are applied to the memory cell 151 according to the write data. At the time of writing, a write current flows bidirectionally through a cell transistor 211 of the memory cell 151. The transfer characteristics of the cell transistor 211 may be different between the case of flowing from the drain to the source and the case of flowing from the source to the drain. For example, when flowing from the source to the drain, the on-resistance becomes higher than when flowing from the drain to the source. As described above, in a case where the on-resistance of the cell transistor 211 varies depending on a direction of the current at the time of writing, it is necessary to adjust the write voltage. That is, it is necessary to change the write voltage between the case of writing the value "1" and the case of writing the value "0". Even in such a case, the leakage current of the elements of the write drive unit 140 can be reduced by adjusting the well potential according to the write voltage.

Since other configurations of the resistance change memory 100 are similar to those of the resistance change memory 100 in the first embodiment of the present disclosure, the description thereof will be omitted.

As described above, the resistance change memory 100 according to the third embodiment of the present disclosure adjusts the write voltage and the well potential according to the data to be written. As a result, the influence of the on-resistance of the cell transistor 211 can be reduced.

4. Memory Device and Electronic Device

Figure 12A:
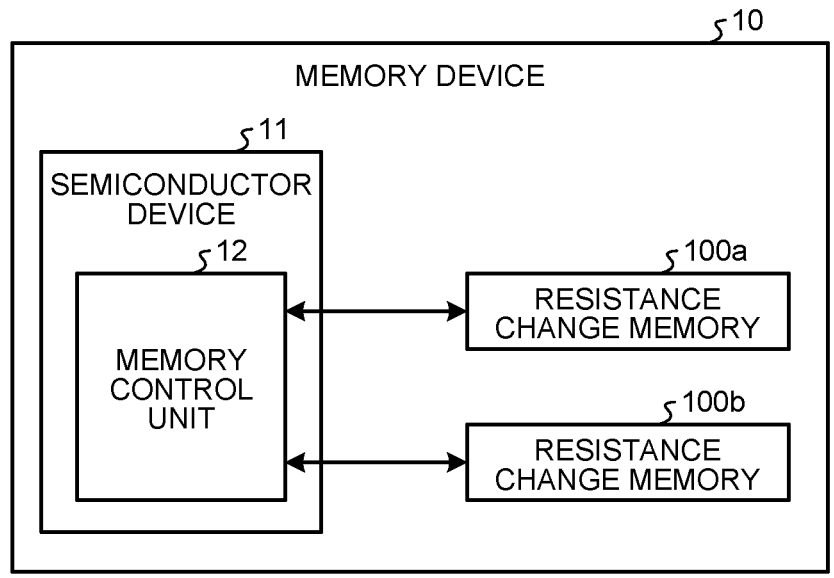
FIG. 12A is a diagram illustrating a configuration example of a memory device according to an embodiment of the present disclosure.
Figure 12B:
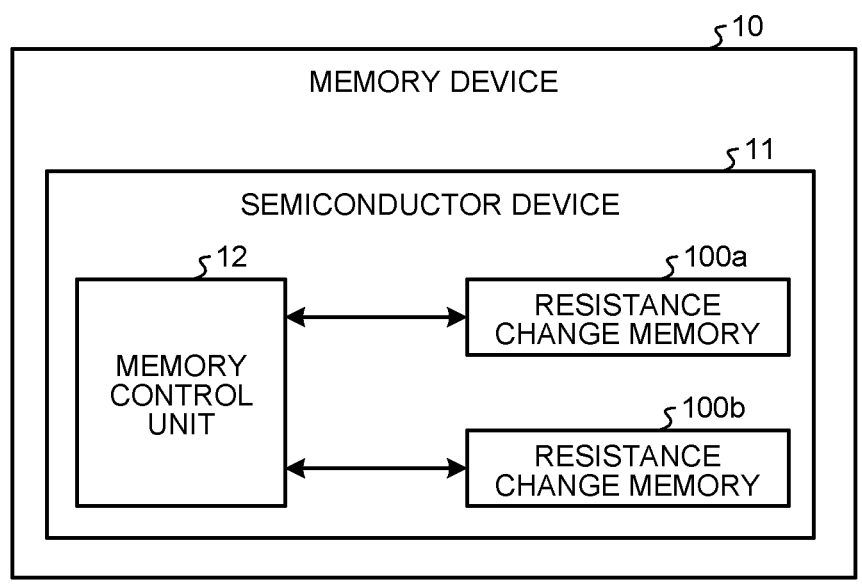
FIG. 12B is a diagram illustrating a configuration example of a memory device according to an embodiment of the present disclosure.

A memory device and an electronic device using the resistance change memory 100 will be described.
[Memory Device]
FIGS. 12A and 12B are diagrams illustrating configuration examples of a memory device according to an embodiment of the present disclosure. FIGS. 12A and 12B are block diagrams illustrating configuration examples of a memory device 10. The memory device 10 is a device that stores data.

The memory device 10 of FIG. 12A includes a semiconductor device 11 and resistance change memories 100a and 100b.

The semiconductor device 11 is a device configured in a semiconductor package, and includes a memory control unit 12. The memory control unit 12 controls the resistance change memories 100a and 100b. The memory control unit 12 controls writing and reading of data in the resistance change memories 100a and 100b.

Figure 13:
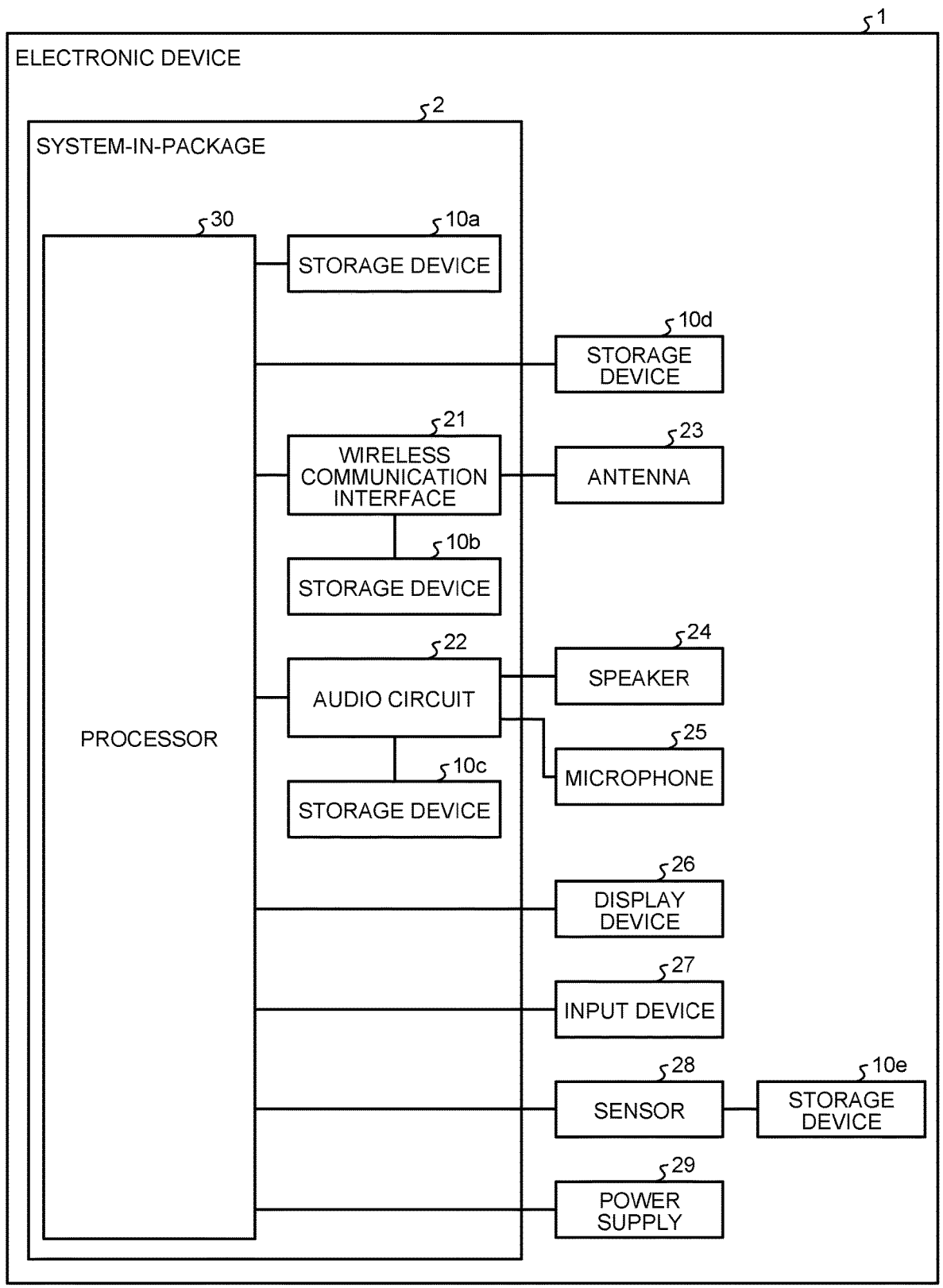
FIG. 13 is a diagram illustrating a configuration example of an electronic device according to an embodiment of the present disclosure.

The memory device 10 in FIG. 12B includes a semiconductor device 11. A memory control unit 12 and resistance change memories 100a and 100b are disposed in the semiconductor device 11. The memory device 10 of FIG. 12B illustrates an example in which the memory control unit 12 and the resistance change memories 100a and 100b are disposed in one semiconductor package.
[Electronic Device]
FIG. 13 is a diagram illustrating a configuration example of an electronic device according to an embodiment of the present disclosure. The drawing is a diagram illustrating a configuration example of an electronic device 1 using the memory device 10 described above.

The electronic device 1 includes a processor 30, storage devices 10a, 10b, 10c, 10d, and 10e, a wireless communication interface 21, an audio circuit 22, an antenna 23, a speaker 24, a microphone 25, and a display device 26. Furthermore, the electronic device 1 further includes an input device 27, a sensor 28, and a power supply 29. Note that the processor 30, the storage devices 10a, 10b, and 10c, the wireless communication interface 21, and the audio circuit 22 are arranged in a system-in-package 2.

The storage devices 10a and 10d are storage devices accessed by the processor 30. The storage device 10b is a storage device accessed by the wireless communication interface 21. The storage device 10c is a storage device accessed by the audio circuit 22. The storage device 10e is a storage device accessed by the sensor 28.

The processor 30 controls the entire electronic device 1.

The wireless communication interface 21 performs wireless communication using the antenna 23. The wireless communication interface 21 has a function of mobile communication, WIFI, or near field communication.

The audio circuit 22 controls the speaker 24 and the microphone 25.

The sensor 28 has a function of an optical sensor, a position sensor, a biosensor, a magnetic sensor, a mechanical amount sensor, a heat sensor, an electric sensor, or a chemical sensor.

Such an electronic device 1 can be applied to a smartphone, a digital camera, a digital video camera, a music player, a set top box, a computer, a television, a watch, an active speaker, a headset, and a game machine. Furthermore, the electronic device 1 can also be applied to a radio, a measuring instrument, an electronic tag, or a beacon. Note that the electronic device 1 is an example of a memory system described in the claims.

Advantageous Effects

The resistance change memory includes the memory cell 151, the write drive unit 140, the write control unit 110, and the well potential adjustment unit 120. The memory cell 151 includes the resistance change element 212. The write drive unit 140 applies a write voltage to the memory cell 151 to perform writing of data. The write control unit 110 outputs a write control signal for controlling the writing to the write drive unit 140. The well potential adjustment unit 120 adjusts the well potential of the well region in which the elements constituting the write drive unit 140 are disposed according to the write voltage at the time of the writing. As a result, the well potential of the element of the write drive unit 140 can be adjusted according to the write voltage.

Furthermore, the write voltage supply unit 130 that supplies the write voltage may be further included, and the well potential adjustment unit 120 may adjust the well potential according to the supplied write voltage. As a result, the well potential of the elements of the write drive unit 140 can be adjusted according to the supplied write voltage.

Furthermore, the write voltage supply unit 130 may supply the write voltage at the time of writing. The write voltage can be supplied at the time of writing.

Furthermore, the write control unit 110 may output the write control signal according to the write voltage at the time of the write. As a result, a control signal corresponding to the write voltage can be applied to the elements of the write drive unit 140.

Furthermore, the well potential adjustment unit 120 may adjust the well potential by applying a well potential selected from a plurality of the well potentials to the well region.

Furthermore, a reference power supply that supplies the plurality of well potentials to the well potential adjustment unit 120 may be further included.

Furthermore, the write drive unit 140 may apply the write voltage selected from a plurality of the write voltages to the memory cell 151, and the well potential adjustment unit 120 may adjust the well potential according to the selected write voltage. As a result, it is possible to supply a well potential corresponding to the plurality of write voltages.

Furthermore, the write drive unit 140 may apply a write voltage corresponding to the data to the memory cell 151, and the well potential adjustment unit 120 may adjust the well potential according to the applied write voltage. As a result, even when the write voltage is changed according to the data, the well potential can be adjusted.

Furthermore, the write drive unit may be configured by the elements including a MOS transistor.

Furthermore, the memory cell 151 may include a magnetoresistive effect element as the resistance change element 212.

The memory device 10 includes the resistance change memory 100 including the memory cell 151, the write drive unit 140, the write control unit 110, and the well potential adjustment unit 120, and the memory control unit 12. The memory cell 151 includes the resistance change element 212. The write drive unit 140 applies a write voltage to the memory cell 151 to perform writing of data. The write control unit 110 outputs a write control signal for controlling the writing to the write drive unit 140. The well potential adjustment unit 120 adjusts the well potential of the well region in which the elements constituting the write drive unit 140 are disposed according to the write voltage at the time of the writing. The memory control unit 12 controls the resistance change memory 100. As a result, the well potential of the element of the write drive unit 140 can be adjusted according to the write voltage.

The memory system (electronic device 1) includes the resistance change memory 100 including the memory cell 151, the write drive unit 140, the write control unit 110, and the well potential adjustment unit 120, the memory control unit 12, and the processor 30. The memory cell 151 includes the resistance change element 212. The write drive unit 140 applies a write voltage to the memory cell 151 to perform writing of data. The write control unit 110 outputs a write control signal for controlling the writing to the write drive unit 140. The well potential adjustment unit 120 adjusts the well potential of the well region in which the elements constituting the write drive unit 140 are disposed according to the write voltage at the time of the writing. The memory control unit 10 controls the resistance change memory 100. The processor 30 accesses the resistance change memory via the memory control unit. As a result, the well potential of the element of the write drive unit 140 can be adjusted according to the write voltage.

Note that the effects described in the present specification are merely examples and are not limited, and other effects may be provided.

Note that the present technique can also have the following configurations.

(1)

A resistance change memory comprising:
a memory cell including a resistance change element;
a write drive unit that applies a write voltage to the memory cell to perform writing of data;
a write control unit that outputs a write control signal for controlling the writing to the write drive unit; and
a well potential adjustment unit that adjusts a well potential of a well region in which an element constituting the write drive unit is arranged according to the write voltage at time of the writing.

(2)

The resistance change memory according to the above (1), further comprising
a write voltage supply unit that supplies the write voltage, wherein
the well potential adjustment unit adjusts the well potential according to the supplied write voltage.

(3)

The resistance change memory according to the above (2), wherein the write voltage supply unit supplies the write voltage at time of the writing.

(4)

The resistance change memory according to any one of the above (1) to (3), wherein the write control unit outputs the write control signal according to the write voltage at time of the writing.

(5)

The resistance change memory according to any one of the above (1) to (4), wherein the well potential adjustment unit adjusts the well potential by applying a well potential selected from a plurality of the well potentials to the well region.

(6)

The resistance change memory according to the above (5), further comprising a reference power supply that supplies the plurality of well potentials to the well potential adjustment unit.

(7)

The resistance change memory according to any one of the above (1) to (6), wherein
the write drive unit applies the write voltage selected from a plurality of the write voltages to the memory cell, and
the well potential adjustment unit adjusts the well potential according to the selected write voltage.

(8)

The resistance change memory according to any one of the above (1) to (7), wherein
the write drive unit applies a write voltage corresponding to the data to the memory cell, and
the well potential adjustment unit adjusts the well potential according to the applied write voltage.

(9)

The resistance change memory according to any one of the above (1) to (8), wherein the write drive unit includes the element including a MOS transistor.

(10)

The resistance change memory according to any one of the above (1) to (9), wherein the memory cell includes a magnetoresistive effect element as the resistance change element.

(11)
A memory device comprising:
a resistance change memory including
a memory cell including a resistance change element,
a write drive unit that applies a write voltage to the memory cell to perform writing of data,
a write control unit that outputs a write control signal for controlling the writing to the write drive unit, and
a well potential adjustment unit that adjusts a well potential of a well region in which an element constituting the write drive unit is arranged according to the write voltage at time of the writing; and
a memory control unit that controls the resistance change memory.

(12)
A memory system comprising:
a resistance change memory including
a memory cell including a resistance change element,
a write drive unit that applies a write voltage to the memory cell to perform writing of data,
a write control unit that outputs a write control signal for controlling the writing to the write drive unit, and
a well potential adjustment unit that adjusts a well potential of a well region in which an element constituting the write drive unit is arranged according to the write voltage at time of the writing;
a memory control unit that controls the resistance change memory; and
a processor that accesses the resistance change memory via the memory control unit.

REFERENCE SIGNS LIST

1 ELECTRONIC DEVICE
2 SYSTEM-IN-PACKAGE
10 MEMORY DEVICE
10b, 10c, 10e STORAGE DEVICE
11 SEMICONDUCTOR DEVICE
12 MEMORY CONTROL UNIT
30 PROCESSOR
100, 100a, 100b RESISTANCE CHANGE MEMORY
110 WRITE CONTROL UNIT
111 INVERTING GATE
120 WELL POTENTIAL ADJUSTMENT UNIT
121, 123, 124 VOLTAGE SOURCE
122, 125 SELECTION UNIT
130 WRITE VOLTAGE SUPPLY UNIT
140 WRITE DRIVE UNIT
150 MEMORY CELL ARRAY
151, 152 MEMORY CELL
211 CELL TRANSISTOR
212 RESISTANCE CHANGE ELEMENT
301 SEMICONDUCTOR SUBSTRATE
302 WELL REGION

The invention claimed is:
1. A resistance change memory, comprising:
a memory cell including a resistance change element;
a write drive unit configured to:
apply a write voltage to the memory cell; and
perform, based on the applied write voltage, a writing operation of data to the memory cell;
a well region that comprises an element constituting the write drive unit;
a write control unit configured to:
output a write control signal based on the write voltage; and
control the writing operation based on the write control signal; and
a well potential adjustment unit configured to adjust a well potential of the well region based on the write voltage.

2. The resistance change memory according to claim 1, further comprising a write voltage supply unit configured to supply the write voltage, wherein the well potential adjustment unit is further configured to adjust the well potential based on the supplied write voltage.

3. The resistance change memory according to claim 2, wherein the write voltage supply unit is further configured to supply the write voltage at time of the writing operation.

4. The resistance change memory according to claim 1, wherein the well potential adjustment unit is further configured to:
select the well potential from a plurality of well potentials;
apply the selected well potential to the well region; and
adjust the well potential based on the application of the selected well potential to the well region.

5. The resistance change memory according to claim 4, further comprising a reference power supply configured to supply the plurality of well potentials to the well potential adjustment unit.

6. The resistance change memory according to claim 1, wherein
the write drive unit is further configured to:
select the write voltage selected from a plurality of write voltages; and
apply the selected write voltage to the memory cell.

7. The resistance change memory according to claim 1, wherein
the applied write voltage corresponds to the data.

8. The resistance change memory according to claim 1, wherein
the write drive unit includes the element, and
the element includes a MOS transistor.

9. The resistance change memory according to claim 1, wherein the resistance change element is a magnetoresistive effect element.

10. A memory device, comprising:
a resistance change memory that includes:
a memory cell including a resistance change element;
a write drive unit configured to:
apply a write voltage to the memory cell; and
perform, based on the applied write voltage, a writing operation of data to the memory cell;
a well region that comprises an element constituting the write drive unit;
a write control unit configured to:
output a write control signal based on the write voltage; and
control the writing operation based on the write control signal; and
a well potential adjustment unit configured to adjust a well potential of the well region based on the write voltage; and
a memory control unit configured to control the resistance change memory.

11. A memory system, comprising:
a resistance change memory that includes:
a memory cell including a resistance change element,
a write drive unit configured to:
apply a write voltage to the memory cell;
perform, based on the applied write voltage, a writing operation of data to the memory cell;

a well region that comprises an element constituting the write drive unit;
a write control unit configured to:
output a write control signal based on the write voltage; and
control the writing operation based on the write control signal;
a well potential adjustment unit configured to adjust a well potential of the well region based on the write voltage;
a memory control unit configured to control the resistance change memory; and
a processor configured to access the resistance change memory via the memory control unit.

* * * * *